United States Patent
Lai et al.

(10) Patent No.: US 7,809,344 B2
(45) Date of Patent: Oct. 5, 2010

(54) FRACTIONAL CARRIER FREQUENCY OFFSET ESTIMATOR AND METHOD OF ESTIMATING FRACTIONAL CARRIER FREQUENCY OFFSET BETWEEN TRANSMITTER AND RECEIVER

(75) Inventors: Jiun-Yo Lai, Taichung (TW); Jen-Yuan Hsu, Kimmen County (TW); Yung-Yih Jian, Taoyuan County (TW); Pang-An Ting, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 766 days.

(21) Appl. No.: 11/785,520

(22) Filed: Apr. 18, 2007

(65) Prior Publication Data

US 2008/0019454 A1    Jan. 24, 2008

Related U.S. Application Data

(60) Provisional application No. 60/831,931, filed on Jul. 20, 2006.

(51) Int. Cl.
*H04B 1/10* (2006.01)
*H04B 15/06* (2006.01)

(52) U.S. Cl. .................. 455/257; 455/317; 375/260; 375/267

(58) Field of Classification Search .............. 375/260, 375/262, 265, 267, 355, 354; 455/255, 257, 455/317, 76; 370/208, 210
See application file for complete search history.

(56) References Cited

U.S. PATENT DOCUMENTS

| 5,732,113 | A | 3/1998 | Schmidl et al. | |
| 7,508,791 | B2 * | 3/2009 | Kalhan et al. | 370/329 |
| 7,613,104 | B2 * | 11/2009 | Bhatt et al. | 370/208 |

* cited by examiner

*Primary Examiner*—Edward Urban
*Assistant Examiner*—Christian A Hannon
(74) *Attorney, Agent, or Firm*—Birch, Stewart, Kolasch & Birch, LLP

(57) ABSTRACT

Fractional carrier frequency offset estimators and related methods are disclosed. The invention may be particularly applied in WiMAX systems. The disclosed method of estimating fractional carrier frequency offset between a transmitter and a receiver includes calculating a first delay correlation based on a first and a second preamble repetitions included in a received signal, processing the phase of the first delay correlation to compensate for a phase rotation of the first delay correlation, and estimating the fractional carrier frequency offset by multiplying a processed phase value, generated after the step of processing the phase of the first delay correlation, by a predetermined value.

14 Claims, 6 Drawing Sheets

FRACTIONAL CARRIER FREQUENCY OFFSET ESTIMATOR AND METHOD OF ESTIMATING FRACTIONAL CARRIER FREQUENCY OFFSET BETWEEN TRANSMITTER AND RECEIVER

CROSS REFERENCE TO RELATED APPLICATIONS

This application claims the benefit of U.S. Provisional Application No. 60/831,931, filed 20, Jul. 2006.

BACKGROUND OF THE INVENTION

1. Field of the Invention

The invention relates to fractional carrier frequency offset estimators and methods of estimating fractional carrier frequency offset between receiver and transmitter. The invention may be particularly applied in Orthogonal Frequency Division Multiplexing (OFDM) related systems including Orthogonal Frequency Division Multiple Access (OFDMA) system, such as WiMAX system.

2. Description of the Related Art

FIG. 1 illustrates a wireless communication system 100, comprising a transmitter 102 and a receiver 104. In the transmitter 102, a signal s(t) is mixed with a signal $e^{j2\pi f_{tx} t}$ and is then broadcast by an antenna 106. The emitted broadcast signal is received by an antenna 108 of the receiver 104. In the receiver 104, the signal received by the antenna 108 is mixed with a signal of $e^{-j2\pi f_{rx} t}$ to generate a received signal r(t), wherein $r(t) = s(t) \cdot e^{j2\pi f_{tx} t} \cdot e^{-j2\pi f_{rx} t} = s(t) \cdot e^{j2\pi (f_{tx} - f_{rx}) t} = s(t) \cdot e^{j2\pi f_\Delta t}$, where $f_\Delta$ represents carrier frequency offset between the transmitter 102 and the receiver 104. After normalizing the carrier frequency $f_\Delta$ to the subcarrier spacing of the system, the carrier frequency offset $f_\Delta$ is divided into integral portion $f_{int}$ and fractional portion $f_{frac}$, wherein $f_\Delta = f_{int} + f_{frac}$. In a conventional technique, such as that disclosed in U.S. Pat. No. 5,732,113, the fractional carrier frequency offset between the transmitter and receiver ($f_{frac}$) is estimated by evaluating a delay correlation based on the first and second preamble repetitions of the received signal r(t) and multiplying the phase of the delay correlation by a predetermined value.

The preamble of a received signal in a WLAN (Wireless Local Area Network, IEEE 802.11a) system is shown in FIG. 2. The preamble comprises a short preamble and a long preamble. The short preamble comprises ten identical preamble repetitions $A_1 \sim A_{10}$, and the long preamble comprises two identical preamble repetitions $B_1$ and $B_2$. In the described conventional technique, the fractional carrier frequency offset ($f_{frac}$) can be estimated by using any two repetitions (e.g., $A_1$ and $A_2$) of the short preamble of a received signal r(t). Based on the sampled data in the first and second preamble repetitions ($A_1$ and $A_2$), a delay correlation, $z_{12}$, is obtained by the formula:

$$z_{12} = \sum_{n=0}^{N-1} r_n \cdot r^*_{(n+D)},$$

where N represents the accumulation samples included in one preamble repetition, D represents the delay between the identical samples of the two preamble repetitions (e.g., $A_1$ and $A_2$), and '*' represents a complex conjugate operation. The sample duration of the received signal r(t) is T. Because $0 \leq n \leq (N-1)$, $r_n$ represents samples in the first preamble repetition $A_1$, $r_{n+D}$ represents samples in the second preamble repetition $A_2$. FIG. 1 shows—r(t) equals $s(t) \cdot e^{j2\pi f_\Delta t}$—$r_n$ is $s_n \cdot e^{j2\pi f_\Delta n T_s}$ and $r_{n+D}$ is $s_{n+D} \cdot e^{j2\pi f_\Delta (n+D) T_s}$. When noise and frequency disturbance are not present in the communication system, $s_n$ equals $s_{n+D}$. The delay correlation, $z_{12}$, can be further simplified as the following:

$$z_{12} = \sum_{n=0}^{N-1} s_n \cdot e^{j2\pi f_\Delta n T_s} \cdot (s_{n+D} \cdot e^{j2\pi f_\Delta (n+D) T_s})^* = e^{-j2\pi f_\Delta D T_s} \sum_{n=0}^{N-1} |s_n|^2. \quad \text{(eq. 1)}$$

Based on the phase of the delay correlation ($\angle z_{12}$), the fractional carrier frequency offset between the transmitter and receiver can be determined by multiplying the phase of the delay correlation ($\angle z_{12}$) by $-1/(2\pi D T_s)$, thus, when the first and second preamble repetitions are exactly identical, the fractional carrier frequency offset is estimated by the formula:

$$f_{frac} = -\frac{1}{2\pi D T_s} \angle z_{12} \quad \text{(eq. 2)}$$

The IEEE 802.16e standard, commonly referred to as the WiMAX (Worldwide Interoperability for Microwave Access), its preamble has three-repetition property. Thus, the delay correlation operation can be applied. The 3-repetition preamble is designed for 3-sector cellular planning. FIG. 3 shows the cellular planning of a WiMAX system. Each cell is divided into three sectors; sector 1, sector 2 and sector 3. In sector 1, a delay correlation, $z_{12}$, based on the first and second preamble repetitions of a received signal, is $C_1 \cdot e^{-j2\pi f_\Delta D T_s} \cdot e^{j\phi_1}$ because the second preamble repetition is not exactly identical to the first preamble repetition. Compared with equation 1, the delay correlation $z_{12}$ of a signal in sector 1 has a phase rotation of $\phi_1$. Similarly, delay correlations of signals in sector 2 and sector 3 have phase rotations of $\phi_2$ and $\phi_3$, respectively. Thus, an improved method for fractional carrier frequency offset estimation is desirable.

BRIEF SUMMARY OF THE INVENTION

The invention relates to fractional carrier frequency offset estimators and methods of estimating fractional carrier frequency offset between receivers and transmitters. The invention may be applied in Orthogonal Frequency Division Multiple Access (OFDMA) systems.

An exemplary embodiment of the method for estimating fractional carrier frequency offset between a transmitter and a receiver comprises: calculating a first delay correlation based on a first and a second preamble repetitions included in a received signal; processing the phase of the first delay correlation to compensate for a phase rotation of the first delay correlation; estimating the fractional carrier frequency offset by multiplying a processed phase value, generated after the step of processing the phase of the first delay correlation, by a predetermined value. The invention further discloses fractional carrier frequency offset estimators complying with the disclosed method.

The above and other advantages will become more apparent with reference to the following description provided in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
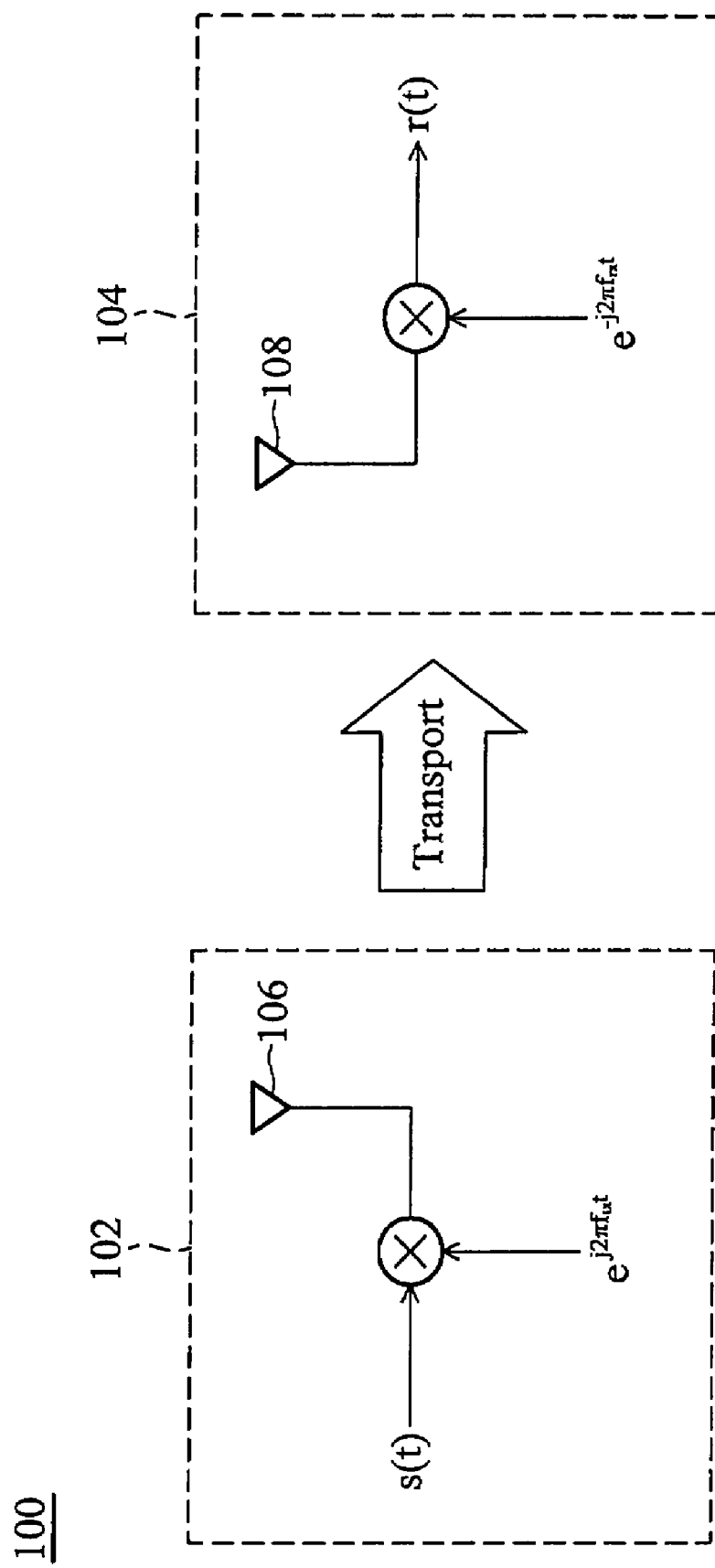
FIG. 1 illustrates a wireless communication system.
Figure 2:
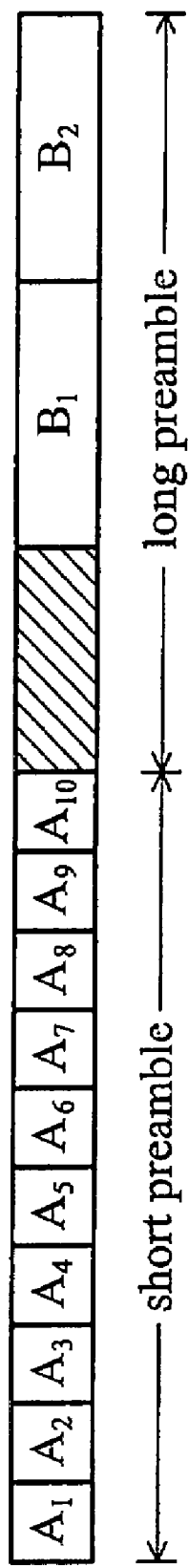
FIG. 2 shows the preamble of a signal of WLAN system.
Figure 3:
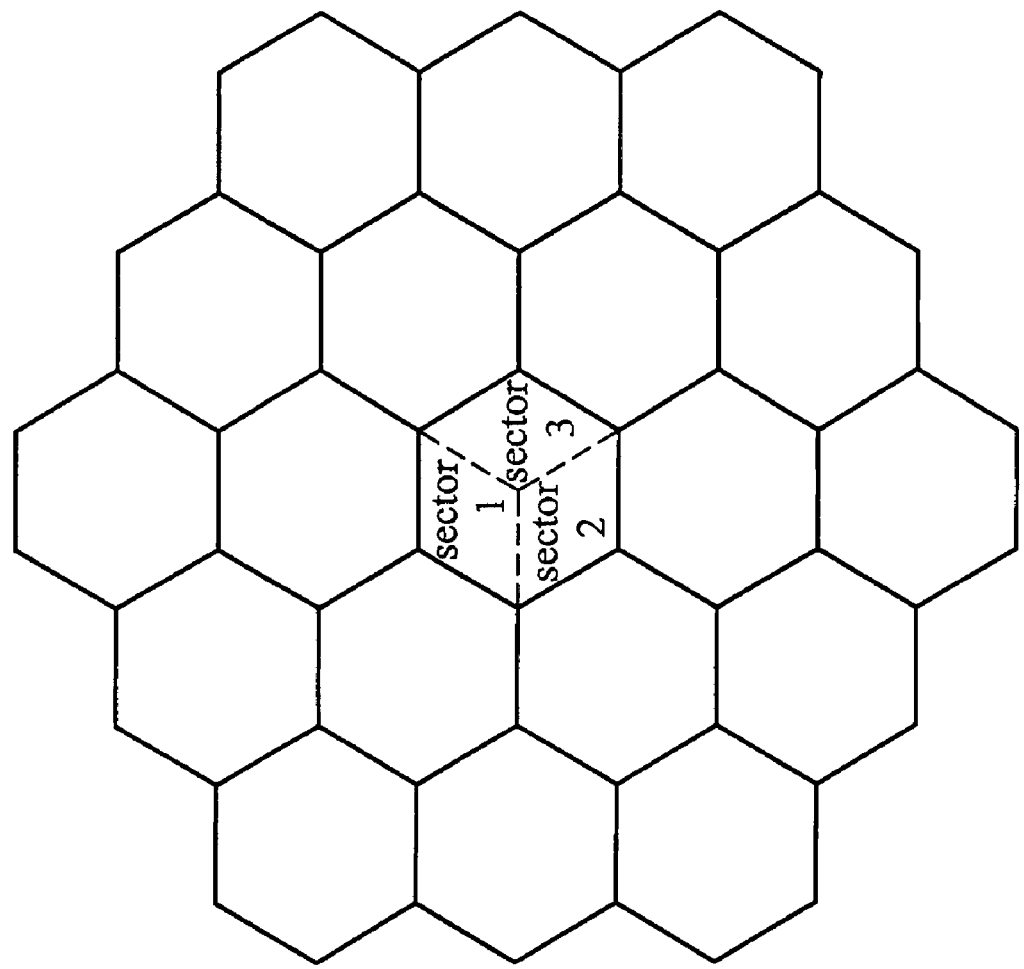
FIG. 3 shows cell structure of a WiMAX system.

The following description is made for the purpose of illustrating the general principles of the invention and should not be taken in a limiting sense. The scope of the invention is best determined by reference to the appended claims.

For WiMAX system (IEEE 802.16e), the preamble has 3-repetition property in time domain, thus, the delay-correlation operation can be applied. However, these three repetitions are not exactly identical for sampled preamble sequence, if sampling rate is not threefold signal bandwidth (In communication system, sampling rate is usually twofold or fourfold signal bandwidth). The delay correlation will induce an undesired phase term. For a mathematical expression:

$$z_{12} = \sum_{n=0}^{N-1} r_n r_{n+D}^* = \sum_{n=0}^{N-1} s_n e^{j2\pi f_\Delta n T_s} s_{n+D} e^{-j2\pi f_\Delta (n+D) T_s},$$

$$= e^{-j2\pi f_\Delta D T_s} \sum_{n=0}^{N-1} |a_n| e^{j\theta_n} |a_{n+D}| e^{-j\theta_{n+D}}$$

$$= C \cdot e^{-j2\pi f_\Delta D T_s} e^{j\varphi}$$

with $s_n = |a_n| e^{j\theta_n}$, and $$C \times e^{j\varphi} = \sum_{n=0}^{N-1} |a_n||a_{n+D}| e^{j(\theta_n - \theta_{n+D})}.$$

We refer to φ an undesired phase term or phase rotation. In addition, the φ value will depend on different preambles. The WiMAX system deploys a cellular planning, three sectors per cell, and each sector has its distinct preamble pattern. Therefore, for different sector (that is different preamble), the undesired phase term has different value. Assume the undesired phase term of delay correlation for sector 1 is $\phi_1$, sector 2 is $\phi_2$, and sector 3 is $\phi_3$. The difference between any two phase terms is 120 degree. In WiMAX system, the experiment shows that the undesired phase terms approximate 3 values, 0 degree and +/−120 degrees. When a WiMAX subscriber received the WiMAX base station signal, it can not distinguish which sector the subscriber belongs to before cell searching. Thus, the delay correlation operation will have an undesired phase term, If multiplying the delay correlation function $z_{12}$ by $e^{j\Phi_1}$, $e^{j\Phi_2}$, $e^{j\Phi_3}$, and generates three processed delay correlations z1, z2, and z3, respectively, wherein, $$z_1 = z_{12} \cdot e^{j\Phi_1} = C \cdot e^{-j2\pi f_\Delta D T_s} e^{j(\varphi - \Phi_1)};$$

$$z_2 = z_{12} \cdot e^{j\Phi_2} = C \cdot e^{-j2\pi f_\Delta D T_s} e^{j(\varphi - \Phi_2)};$$

$$z_3 = z_{12} \cdot e^{j\Phi_3} = C \cdot e^{-j2\pi f_\Delta D T_s} e^{j(\varphi - \Phi_3)}$$

Take the preamble of sector 2 for example. When the received preamble belongs to sector 2 (i.e., $$\left(\text{i.e., } \varphi = \varphi_2 = 120° = \frac{2}{3}\pi \text{ radian}\right),$$

the phase terms of the processed delay correlation are:

$$\angle z_1 = -2\pi f_\Delta D T_s + \left(\frac{2}{3}\pi - 0\right) = -2\pi f_\Delta D T_s + \frac{2}{3}\pi,$$

$$\angle z_2 = -2\pi f_\Delta D T_s + \left(\frac{2}{3}\pi - \frac{2}{3}\pi\right) = -2\pi f_\Delta D T_s,$$

$$\angle z_3 = -2\pi f_\Delta D T_s + \left(\frac{2}{3}\pi + \frac{2}{3}\pi\right) = -2\pi f_\Delta D T_s + \frac{4}{3}\pi,$$

The summation of $\angle z_1$, $\angle z_2$ and $\angle z_3$ is $(-6\pi f_\Delta D T_s + 2\pi)$. Fractional carrier frequency offset between transmitter and receiver ($f_{frac}$) can be estimated by converting $(-6\pi f_\Delta D T_s + 2\pi)$ to a range $-\pi \sim \pi$ and multiplying the converted phase value by $$-\frac{1}{6\pi D T_s}.$$

When the received signal belongs to sector 1 or 3, the fractional carrier frequency offset $f_{frac}$ can be similarly estimated. The fractional carrier frequency offset between transmitter and receiver ($f_{frac}$) can be estimated by the formula:

$$f_{frac} = -\frac{1}{6\pi D T_s} \times (\angle z_1 + \angle z_2 + \angle z_3).$$

Furthermore, the summation of $\angle z_1$, $\angle z_2$ and $\angle z_3$ can be simplified as the following:

$$\angle z_1 + \angle z_2 + \angle z_3 = \begin{matrix}(-2\pi f_\Delta D T_s + \varphi - \varphi_1) + \\ (-2\pi f_\Delta D T_s + \varphi - \varphi_2) + (-2\pi f_\Delta D T_s + \varphi - \varphi_3)\end{matrix}$$

$$= 3 \cdot (-2\pi f_\Delta D T_s + \varphi) - (\varphi_1 + \varphi_2 + \varphi_3)$$

$$= 3 \cdot \angle z_{12} - (\varphi_1 + \varphi_2 + \varphi_3)$$

$$= [3 \cdot \angle z_{12}]_{-\pi}^{\pi}$$

because the summation of $\phi_1$, $\phi_2$ and $\phi_3$ is $2\pi$ radian in WiMAX systems and $[\text{phase}]_{-\pi}^{\pi}$ represents a function of converting phase to a range $-\pi \sim \pi$. Thus, the fractional carrier frequency offset $f_{frac}$ is estimated by the formula:

$$f_{frac} = -\frac{1}{6\pi DT_s} \times [3 \cdot \angle z_{12}]_{-\pi}^{\pi} \quad \text{(eq. 3)}$$

It should be noted that equation 3 is not limited to a system in which $\phi_1$ is 0°, $\phi_2$ is 120° and $\phi_3$ is −120°. Equation 3 is applicable to estimating fractional carrier frequency offset in any system where the phase difference between $\phi_1$, $\phi_2$ and $\phi_3$ is 120°.

Although the invention performs well in fixed channel models, such as the SUI-4 channel model and the AWGN channel model, the invention does not perform very well in channel models for mobile devices, such as the ITU-R Vehicular-A channel model. In such a case, an alternative fractional carrier frequency offset estimator was invented, it requires two delay correlations $z_{12}$ and $z_{13}$, where $z_{12}$ is obtained from the first and second preamble repetitions of the received preamble and $z_{13}$ is obtained from the first and third preamble repetitions of the received preamble. $z_{12}$ and $z_{13}$ are obtained by the formulae:

$$z_{12} = \sum_{n=0}^{N-1} r_n \cdot r^*_{(n+D)} =$$

$$\sum_{n=0}^{N-1} s_n \cdot e^{j2\pi f_\Delta nT_s} \cdot (s_{n+D} \cdot e^{j2\pi f_\Delta (n+D)T_s})^* = A \cdot e^{-j2\pi f_\Delta DT_s} \cdot e^{j\varphi}$$

and $$z_{13} = \sum_{n=0}^{N-1} r_n \cdot r^*_{(n+2D)} =$$

$$\sum_{n=0}^{N-1} s_n \cdot e^{j2\pi f_\Delta nT_s} \cdot (s_{n+2D} \cdot e^{j2\pi f_\Delta (n+2D)T_s})^* = B \cdot e^{-j2\pi f_\Delta 2DT_s} \cdot e^{j\theta}$$

where $$A \cdot e^{j\varphi} = \sum_{n=0}^{N-1} |s_n||s_{n+D}|e^{j(\varphi_n - \varphi_{n+D})},$$

and $$B \cdot e^{j\theta} = \sum_{n=0}^{N-1} |s_n||s_{n+2D}|e^{j(\varphi_n - \varphi_{n+2D})}.$$

In WiMAX system, $\theta = -\phi$. The summation of the phases of the delay correlations $z_{12}$ and $z_{13}$ is $-6\pi f_\Delta DT_s + (\phi + \theta)$ and can be further simplified to $-6\pi f_\Delta DT_s$. Thus, the fractional carrier frequency offset $f_{frac}$ is obtained by the formula:

$$f_{frac} = -\frac{1}{6\pi DT_s} \times (\angle z_{12} + \angle z_{13}) \quad \text{(eq. 4)}$$

It should be noted that equation 4 is not limited to channel models for mobile devices, such as the ITU-R Vehicular-A channel model. The fractional carrier frequency offset estimator based on equation 4 still performs well in other channel models, such as the SUI-4 and AWGN channel models.

Figure 4:
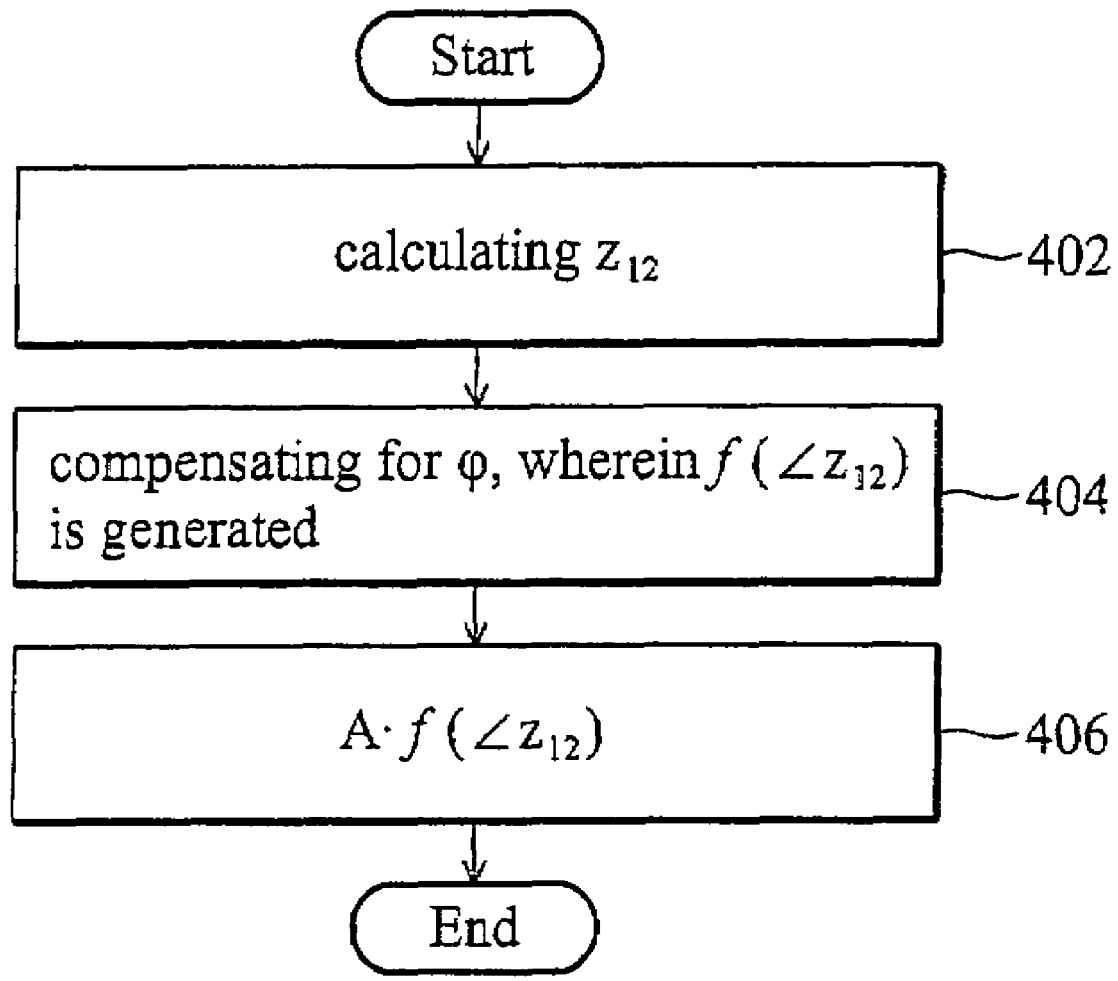
FIG. 4 shows a flow chart of one embodiment of the disclosed method.

A flow chart of an embodiment of the disclosed method is shown in FIG. 4. Based on the first and second preamble repetitions included in a received signal r(t), a first delay correlation $z_{12}$ is obtained in step 402, wherein $$z_{12} = \sum_{n=0}^{N-1} r_n \cdot r^*_{(n+D)},$$

where N represents the accumulation samples included in one preamble repetition, D represents the delay between the identical samples of the two preamble repetitions, and '*' acts as complex conjugation. There is a phase rotation $\phi$ included in the first delay correlation $z_{12}$. In step 404, the first delay correlation phase ($\angle z_{12}$) is processed to compensate for the phase rotation of the first delay correlation ($\phi$), generating a processed phase value f($\angle z_{12}$). In step 406, the processed phase value f($\angle z_{12}$) is multiplied by a predetermined value A to estimate fractional carrier frequency offset between transmitter and receiver. It should be noted that $z_{12}$ is not limited to be calculated by the first and second preamble repetitions in a received signal r(t), $z_{12}$ could be calculated by any two adjacent preamble.

In an embodiment of the invention, the received signal r(t) may belong to a first sector, a second sector or a third sector. When the received signal belongs to the first sector, phase rotation of the first delay correlation $z_{12}$ is $\phi_1$. When the received signal belongs to the second sector, phase rotation of the first delay correlation $z_{12}$ is $\phi_2$. When the received signal belongs to the third sector, phase rotation of the first delay correlation $z_{12}$ is $\phi_3$. Phase difference between $\phi_1$, $\phi_2$ and $\phi_3$ is 120°. The modulation scheme of the received signal in the invention is Orthogonal Frequency Division Multiplexing (OFDM), particularly applied to the IEEE 802.16e standard, commonly referred to as WiMAX.

In an embodiment of the invention based on equation 3, the process in step 404 further comprises evaluating a first value by multiplying the phase of the first delay correlation ($\angle z_{12}$) by 3, and converting the first value ($3 \cdot \angle z_{12}$) to a range $-\pi \sim \pi$ to generate the processed phase value f($\angle z_{12}$), wherein f($\angle z_{12}$) = $[3 \cdot \angle z_{12}]_{-\pi}^{\pi}$, where $[phase]_{-\pi}^{\pi}$, acts as a function for converting phase to a range $-\pi \sim \pi$. The predetermined value A equals $$-\frac{1}{6\pi DT_s},$$

where $\pi$ represents ratio of the circumference of a circle to its diameter, and $T_s$ represents the sample duration of the received signal r(t).

In an embodiment of the invention based on equation 4, the process in step 404 further comprises calculating a second delay correlation $z_{13}$ based on the first and third preamble repetitions of the received signal r(t) (according to the formula:

$$z_{13} = \sum_{n=0}^{N-1} r_n \cdot r^*_{(n+2D)}),$$

and adding the phases of the first and second delay correlations up to generate the processed phase value f($\angle z_{12}$), wherein f($\angle z_{12}$) = ($\angle z_{12} + \angle z_{13}$). The predetermined value A equals $$-\frac{1}{6\pi DT_s},$$

where π represents the ratio of the circumference of a circle to its diameter, and $T_s$ represents the sample duration of the received signal r(t).

Figure 5:
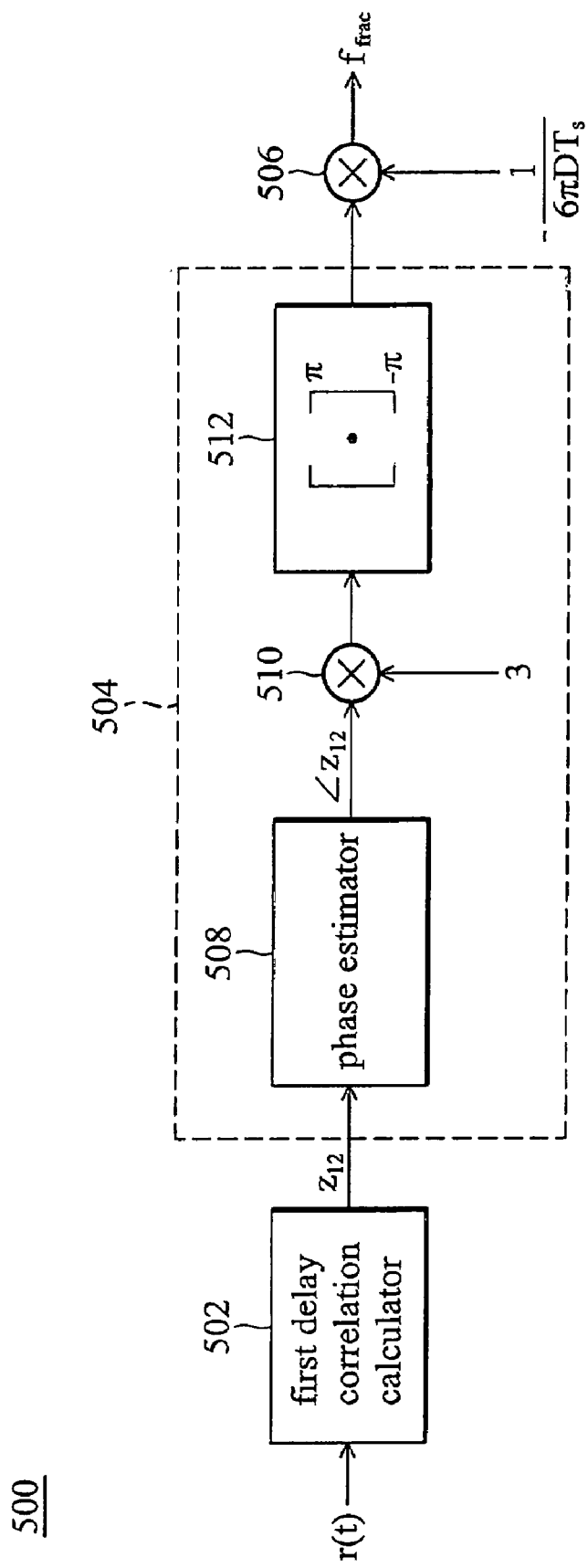
FIG. 5 shows one embodiment of the disclosed fractional carrier frequency offset estimator based on equation 3.

An embodiment of a fractional carrier frequency offset estimator of the invention based on equation 3 is shown in FIG. 5. The fractional carrier frequency offset estimator 500 comprises a first delay correlation calculator 502, a phase rotation compensator 504, and a first multiplier 506. The first delay correlation calculator 502 calculates a first delay correlation $z_{12}$ based on the first and second preamble repetitions of a received signal r(t). The first delay correlation $z_{12}$ is calculated according to the formula:

$$z_{12} = \sum_{n=0}^{N-1} r_n \cdot r^*_{(n+D)},$$

where N represents the accumulation samples included in one preamble repetition, D represents the delay between the identical samples of the two preamble repetitions, and '*' acts as a conjugate function. There is a phase rotation φ included in the first delay correlation $z_{12}$. To compensate for the phase rotation of the first delay correlation (φ), the phase rotation compensator 504 processes the phase of the first delay correlation (∠$z_{12}$) and generates a processed phase value f(∠$z_{12}$). As shown in FIG. 5, the phase rotation compensator 504 further comprises a phase estimator 508, a second multiplexer 510, and a phase converter 512. The phase estimator 508 estimates the phase of the first delay correlation (∠$z_{12}$). The second multiplexer 510 multiplies the phase of the first delay correlation (∠$z_{12}$) by 3 to obtain a first value (3·∠$z_{12}$). The phase converter 512 converts the first value to a range –π~π to generate the processed phase value [3·∠$z_{12}$]$_{-\pi}^{\pi}$, where [phase]$_{-\pi}^{\pi}$, acts as a function of converting phase to a range –π~π. The first multiplier 506 multiplies the processed phase value [3·∠$z_{12}$]$_{-\pi}^{\pi}$ by a predetermined value $$\left(-\frac{1}{6\pi DT_s}\right)$$

to estimate fractional carrier frequency offset between a transmitter and a receiver, where π represents ratio of the circumference of a circle to its diameter, and $T_s$ represents the sample duration of the received signal r(t).

Figure 6:
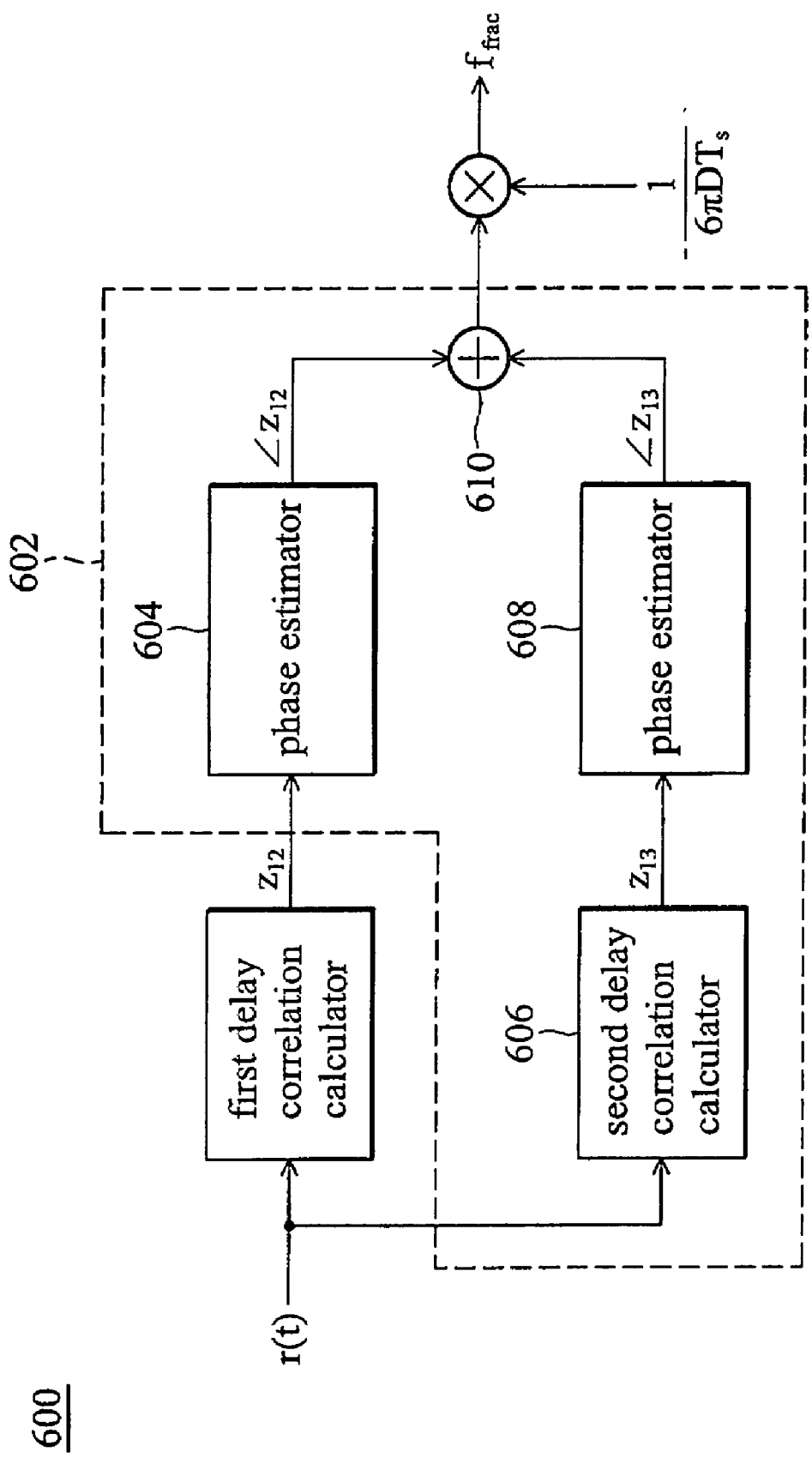
FIG. 6 shows one embodiment of the disclosed fractional carrier frequency offset estimator based on equation 4.

An embodiment of fractional carrier frequency offset estimator of the invention based on equation 4 is shown in FIG. 6. Compared to the fractional carrier frequency offset estimator 500, the fractional carrier frequency offset estimator 600 has a different phase rotation compensator 602. The phase rotation compensator 602 comprises a first phase estimator 604, a second delay correlation calculator 606, a second phase estimator 608, and an adder 610. The second delay correlation calculator 606 calculates a second delay correlation $z_{13}$ based on the first and third preamble repetitions of the received signal r(t) (according to the formula:

$$z_{13} = \sum_{n=0}^{N-1} r_n \cdot r^*_{(n+2D)}).$$

It should be noted that $z_{13}$ is not limited to be calculated by the first and third preamble repetitions of the received signal r(t). The first and second phase estimators 604 and 608 respectively estimate the phases of the first and second delay correlations (∠$z_{12}$ and ∠$z_{13}$). The adder 610 adds the phases of the first and second delay correlations (∠$z_{12}$ and ∠$z_{13}$) to generate the processed phase value (∠$z_{12}$+∠$z_{13}$). The fractional carrier frequency offset estimator 600 performs well in channel models for mobile devices, such as the ITU-R Vehicular-A channel model.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A method of estimating fractional carrier frequency offset between a transmitter and a receiver, comprising:
    calculating a first delay correlation based on a first and a second preamble repetitions included in a received signal;
    processing the phase of the first delay correlation to compensate for a phase rotation of the first delay correlation, wherein a processed phase value is generated; and
    estimating the fractional carrier frequency offset between the transmitter and the receiver by multiplying the processed phase value by a predetermined value,
    wherein in the step of processing the phase of the first delay correlation further comprises:
        evaluating a first value by multiplying the phase of the first delay correlation by 3; and
        converting the first value to a range –π~π to generate the processed phase value.

2. The method as claimed in claim 1, wherein the received signal can be classified as belonging to a first sector, a second sector or a third sector, wherein phase rotations of first delay correlations calculated from received signals belonging to the three different sectors are different and have a phase difference of 120 degrees therebetween.

3. The method as claimed in claim 1, wherein the modulation scheme of the received signal is Orthogonal Frequency Division Multiplexing.

4. The method as claimed in claim 3, wherein the Orthogonal Frequency Division Multiple Access is used in IEEE 802.16e standard, commonly referred to as WiMAX.

5. The method as claimed in claim 1, wherein the predetermined value is the inverse of minus 6·π·D·$T_s$, where π represents the ratio of the circumference of a circle to its diameter, $T_s$ represents the sample duration of the received signal, and D represents the delay between the first and the second preamble repetitions.

6. A method of estimating fractional carrier frequency offset between a transmitter and a receiver, comprising:
    calculating a first delay correlation based on a first and a second preamble repetitions included in a received signal;

processing the phase of the first delay correlation to compensate for a phase rotation of the first delay correlation, wherein a processed phase value is generated; and estimating the fractional carrier frequency offset between the transmitter and the receiver by multiplying the processed phase value by a predetermined value, wherein the step of processing the phase of the first delay correlation further comprises:

calculating a second delay correlation based on the first and a third preamble repetitions of the received signal; and adding the phases of the first and second delay correlations to generate the processed phase value.

7. The method as claimed in claim 6, wherein the predetermined value is the inverse of minus $6 \cdot \pi \cdot D \cdot T_s$, where $\pi$ represents ratio of the circumference of a circle to its diameter, $T_s$ represents the sample duration of the received signal, and D represents the delay between the first and second preamble repetitions.

8. A fractional carrier frequency offset estimator, comprising:

a first delay correlation calculator, calculating a first delay correlation based on a first and a second preamble repetitions of a received signal;

a phase rotation compensator, compensating for a phase rotation of the first delay correlation by processing the phase of the first delay correlation, wherein a processed phase value is generated; and a first multiplier, multiplying the processed phase value by a predetermined value to estimate fractional carrier frequency offset between a transmitter and a receiver, wherein the phase rotation compensator further comprises:

a phase estimator, estimating the phase of the first delay correlation;

a second multiplexer, evaluating a first value by multiplying the phase of the first delay correlation by 3; and a phase converter, converting the first value to a range to generate the processed phase value.

9. The fractional carrier frequency offset estimator as claimed in claim 8, wherein the received signal can be classified as belonging to a first sector, a second sector or a third sector, wherein phase rotations of first delay correlations calculated from received signals belonging to the three different sectors are different and have a phase difference of 120 degrees therebetween.

10. The fractional carrier frequency offset estimator as claimed in claim 8, wherein the modulation scheme of the received signal is Orthogonal Frequency Division Multiple Access.

11. The fractional carrier frequency offset estimator as claimed in claim 10, wherein the Orthogonal Frequency Division Multiple Access is used in IEEE 802.16e standard, commonly referred to as WiMAX.

12. The fractional carrier frequency offset estimator as claimed in claim 8, wherein the predetermined value is the inverse of minus $6 \cdot \pi \cdot D \cdot T_s$, where $\pi$ represents ratio of the circumference of a circle to its diameter, $T_s$ represents the sample duration of the received signal, and D represents delay between the first and second preamble repetitions.

13. A fractional carrier frequency offset estimator, comprising:

a first delay correlation calculator, calculating a first delay correlation based on a first and a second preamble repetitions of a received signal;

a phase rotation compensator, compensating for a phase rotation of the first delay correlation by processing the phase of the first delay correlation, wherein a processed phase value is generated; and a first multiplier, multiplying the processed phase value by a predetermined value to estimate fractional carrier frequency offset between a transmitter and a receiver, wherein the phase rotation compensator further comprises:

a first phase estimator, estimating the phase of the first delay correlation;

a second delay correlation calculator, calculating a second delay correlation based on the first and a third preamble repetitions of a received signal;

a second phase estimator, estimating the phase of the second delay correlation; and an adder, adding the phases of the first and second delay correlations to generate the processed phase value.

14. The fractional carrier frequency offset estimator as claimed in claim 13, wherein the predetermined value is the inverse of minus $6 \cdot \pi \cdot D \cdot T_s$, where $\pi$ represents ratio of the circumference of a circle to its diameter, $T_s$ represents the sample duration of the received signal, and D represents delay between the first and second preamble repetitions.

* * * * *